(12) United States Patent
Zou et al.

(10) Patent No.: US 12,278,488 B2
(45) Date of Patent: Apr. 15, 2025

(54) METHOD AND DEVICE FOR DETERMINING PARAMETER OF PASSIVE IMPEDANCE ADAPTER APPLICABLE TO VSC-HVDC

(71) Applicant: ELECTRIC POWER RESEARCH INSTITUTE. CHINA SOUTHERN POWER GRID, Guangdong (CN)

(72) Inventors: Changyue Zou, Guangdong (CN); Hong Rao, Guangdong (CN); Xiaobin Zhao, Guangdong (CN); Shukai Xu, Guangdong (CN); Yan Li, Guangdong (CN); Jun Chen, Guangdong (CN); Qingming Xin, Guangdong (CN); Weiwei Li, Guangdong (CN); Shuangfei Yang, Guangdong (CN); Junjie Feng, Guangdong (CN)

(73) Assignee: ELECTRIC POWER RESEARCH INSTITUTE. CHINA SOUTHERN POWER GRID, Guangdong (CN)

( * ) Notice: Subject to any disclaimer, the term of this patent is extended or adjusted under 35 U.S.C. 154(b) by 855 days.

(21) Appl. No.: 17/460,151

(22) Filed: Aug. 27, 2021

(65) Prior Publication Data

US 2021/0391746 A1 Dec. 16, 2021

Related U.S. Application Data

(63) Continuation of application No. PCT/CN2019/103748, filed on Aug. 30, 2019.

(30) Foreign Application Priority Data

Feb. 27, 2019 (CN) .......................... 201910146827.6

(51) Int. Cl.
*H02J 13/00* (2006.01)
*G05B 19/042* (2006.01)
*H02J 3/36* (2006.01)

(52) U.S. Cl.
CPC ...... *H02J 13/00002* (2020.01); *G05B 19/042* (2013.01); *H02J 3/36* (2013.01); *G05B 2219/2639* (2013.01)

(58) Field of Classification Search
None
See application file for complete search history.

(56) References Cited

U.S. PATENT DOCUMENTS

| 2010/0118568 A1* | 5/2010 | Helle | ................ H02M 1/12 363/34 |
| 2017/0030978 A1* | 2/2017 | Choi | ..................... H02J 3/36 |

FOREIGN PATENT DOCUMENTS

JP 3822910 B2 * 9/2006 ............... H02J 3/01

* cited by examiner

*Primary Examiner* — Thomas C Lee
*Assistant Examiner* — Anzuman Sharmin
(74) *Attorney, Agent, or Firm* — Yue (Robert) Xu; Apex Attorneys at Law, LLP (57) ABSTRACT

Method for determining parameter of a passive impedance adapter applicable to VSC-HVDC, including: S1. obtaining VSC-HVDC impedance and VSC-HVDC impedance curve $X(f)$ based on VSC-HVDC impedance; S2. estimating upper limit value of the main capacitor in the passive impedance adapter; S3. calculating adapter parameter curve $X_{adapter}(f)$; S4. determining value of the main capacitor and varying value of the main resistor until $\min[X(f)-X_{adapter}(f)]$ is maximized; determining whether $\min[X(f)-X_{adapter}(f)]>k$ holds; S5. If $\min[X(f)-X_{adapter}(f)]>k$ does not hold, increasing the value of the main capacitor and performing steps S2-S4 until $\min[X(f)-X_{adapter}(f)]>k$ holds when the value of the main capacitor is within the range of the value of the (Continued)

main capacitor, storing the parameters in an available parameter set; S6. reducing the value of the main capacitor, and storing the parameters when $\min[X(f) - X_{adapter}(f)] > k$ holds in the available parameter set; S7. selecting the available parameters from the available parameter set.

15 Claims, 6 Drawing Sheets

METHOD AND DEVICE FOR DETERMINING PARAMETER OF PASSIVE IMPEDANCE ADAPTER APPLICABLE TO VSC-HVDC

CROSS REFERENCE TO RELATED APPLICATIONS

The present application is a Continuation Application of PCT Application No. PCT/CN2019/103748 filed on Aug. 30, 2019, which claims the benefit of Chinese Patent Application No. 201910146827.6 filed on Feb. 27, 2019. All the above are hereby incorporated by reference in their entirety.

FIELD OF THE INVENTION

The present disclosure relates to the field of VSC-HVDC system optimization, in particular, to a method and a device for determining a parameter of a passive impedance adapter applicable to VSC-HVDC (voltage source converter-high voltage dc transmission).

BACKGROUND OF THE INVENTION

Hydropower resources in China are mainly distributed in the southwest region, while the electricity loads are distributed in the eastern region in a relatively concentrated manner. The implementation of long-distance, large-capacity "West-to-East Power Transmission" is an objective requirement for China to optimize resource allocation and solve the inverse distribution of resources and electricity loads, as well as an important measure to turn resource advantages of the underdeveloped western regions into economic advantages and promote common economic development of the eastern and western regions. DC power transmission, which uses power electronic conversion technology, transmits high-voltage DC power converted from clean hydropower at the sending end through long-distance overhead lines to load centers at the receiving end. It has high transmission efficiency, saved cost and transmission corridors and becomes the main method of "West-to-East Power Transmission".

As a new generation of DC transmission technology based on voltage source converters, the VSC-HVDC transmission has significant advantages in new energy consumption, economy, flexibility, reliability, etc., and has been developed rapidly in recent years. However, with the continuous increase of VSC-HVDC transmission capacity and the large-scale application of high-power electronic equipment in the power grid, VSC-HVDC transmission has the risk of generating high-band resonance with the connected grid and affecting the safety and stability of the power grid and the safety of power equipment.

Currently, there are three types of harmonic resonance suppression schemes, i.e., limiting grid impedance, optimizing VSC-HVDC impedance, and adding auxiliary equipment.

(1) In the prior art, the impedance of the power grid depends on factors such as operation mode, load, power flow, etc., and the amplitude and phase of the impedance may vary widely. Because the operation modes are set depending on many factors and may be forcedly changed due to AC faults such as lightning strikes and the like, it is difficult to use a scheme which restricts the operation mode to avoid harmonic resonance as a long-term scheme.

(2) Adding auxiliary equipment will bring extra cost, and there is currently no disclosed method of designing auxiliary equipment.

(3) By optimizing the control strategy, the risk of harmonic resonance can be reduced to a certain extent. The published analysis shows that, compared with direct feed-forward, adding a low-pass filter in the feedforward loop helps reduce the risk of resonance. Nevertheless, with delay feature of the long control link, adding a low-pass filter cannot completely avoid the risk of high-band resonance.

SUMMARY OF THE INVENTION

The embodiments of the present disclosure provide a method for determining a parameter of a passive impedance adapter applicable to VSC-HVDC, which can realize the determination of the parameter of the passive impedance adapter parameter, whereby the positive impedance characteristic is realized in the full frequency band of interest, and the risk of harmonic resonance is completely eliminated.

The first embodiment of the present disclosure provides a method for determining a parameter of a passive impedance adapter applicable to VSC-HVDC, wherein, the passive impedance adapter comprises a main capacitor, a main resistor and a branching inductor; the main capacitor is connected in series with the main resistor; the branching inductor is connected in parallel across the main resistor;

The method for determining the parameter comprises steps of:

S1. obtaining VSC-HVDC impedances and a VSC-HVDC impedance curve X(f) based on the VSC-HVDC impedances;

S2. estimating an upper limit value of the main capacitor in the passive impedance adapter;

S3. calculating an adapter parameter curve $X_{adapter}(f)$ associated with the main capacitor, the branching inductor and the main resistor of the passive impedance adapter;

S4. determining a value of the main capacitor within a range of the value of the main capacitor and varying a value of the main resistor until $\min[X(f)-X_{adapter}(f)]$ is maximized; determining whether $\min[X(f)-X_{adapter}(f)] > k$ holds at that time; wherein, k is a preset threshold;

S5. if $\min[X(f)-X_{adapter}(f)] > k$ does not hold, increasing the value of the main capacitor and performing steps S2-S4 until $\min[X(f)-X_{adapter}(f)] > k$ holds when the value of the main capacitor is less than the upper limit value of the main capacitor; outputting and storing current values of the main capacitor, the branching inductor and the main resistor as available parameters in an available parameter set; if $\min[X(f)-X_{adapter}(f)] > k$ does not hold when the value of the main capacitor is a maximum value within the range of the value of the main capacitor, performing step S4 with a value of k being reduced;

S6. if $\min[X(f)-X_{adapter}(f)] > k$ holds, reducing a value of the main capacitor C until $\min[X(f)-X_{adapter}(f)] > k$ does not hold, and outputting and storing the values of the main capacitor, the branching inductor, and the main resistor during the reduction of the value of the main capacitor C as available parameters in the available parameter set;

S7. selecting the available parameter from the available parameter set.

As an improvement of the above solution, the VSC-HVDC impedance curve is formulated as:

$$X(f) = \begin{cases} \dfrac{|Z_1(f)|^2}{|Re(Z_1(f))|} & Re(Z_1(f)) < 0 \\ +\infty & Re(Z_1(f)) > 0 \end{cases}$$

Herein, $|Z_1(f)|$ is an impedance magnitude of the VSC-HVDC at a frequency point f, and $Re(Z_1(f))$ is a real part of the VSC-HVDC impedance at the frequency point f.

As an improvement of the above solution, wherein the estimating of the upper limit value of the main capacitor in the passive impedance adapter, specifically, is performed according to a formula:

$$C = a\% \times \dfrac{S_c}{\omega_0 U^2}$$

In the formula, $S_C$ is a short-circuit capacity of an access point of a converter station; U is a rated voltage of the access point of the converter station; wo is an angular frequency of a fundamental wave; a is a voltage fluctuation value allowed in standard;

The upper limit value of the main capacitor is set according to values of the short-circuit capacity at the access point of the converter station, the rated voltage at the access point of the converter station and the fundamental frequency.

As an improvement of the above solution, the parameter curve of the adapter may be formulated as:

$$X_{adapter}(f) = \dfrac{|Z_{adapter}(f)|}{\cos\phi(f)}$$

Herein, $X_{adapter}(f)$ is an impedance amplitude of the passive impedance adapter.

As an improvement of the above solution, the step S5 further comprises: performing steps S2-S4 with the value of the main capacitor being reduced until the value of the main capacitor is minimized within the range of the value of the main capacitor; and adding corresponding values of the main capacitor, branching inductor and main resistor into the available parameter set.

The second embodiment of the present disclosure correspondingly provides a parameter determination device for a passive impedance adapter applicable to VSC-HVDC, comprising a processor, a memory, and a computer program stored in the memory and configured to be executed by the processor, the processor is configured for executing the computer program to implement the method for determining the parameter of the passive impedance adapter applicable to VSC-HVDC described in the first embodiment of present disclosure.

The third embodiment of the present disclosure correspondingly provides a computer-readable storage medium, wherein the computer-readable storage medium comprises a computer program stored therein, wherein when the computer program is executed, a device on which the computer-readable storage medium is mounted is controlled to execute the method for determining the parameter of the passive impedance adaptor applicable to VSC-HVDC described in the first embodiment of present disclosure.

Compared with the prior art, the method for determining the parameter of the passive impedance adapter applicable to VSC-HVDC according to the embodiments of the present disclosure has the following beneficial effects.

By estimating the range of the value of the main capacitor, and optimizing the value of the main capacitor in the range of the value of the main capacitor until $X_{Z1}(f)-X_{adapter}(f)$ which is greater than the preset threshold k holds in the full frequency band, it realizes positive impedance characteristics in the full frequency band of interest, and completely eliminates the risk of harmonic resonance. It avoids high-band resonance which may be caused when the impedance between the VSC-HVDC transmission system and the transmitting or receiving power grid is mismatched, thereby ensuring safe and stable operation of the power system. By adjusting the value of k to change the design standard, a variety of available parameters which meet the requirements and facilitate system stability and suppression of low-frequency oscillations can be obtained.

DETAILED DESCRIPTION OF THE INVENTION

The technical solutions in the embodiments of the present disclosure will be described clearly and completely in conjunction with the figures in the embodiments of the present disclosure. Obviously, the described embodiments are only a part of the embodiments of the present disclosure, but not all the embodiments. Based on the embodiments of the present disclosure, all other embodiments obtained by those skilled in the art without inventive efforts fall within the protection scope of the present disclosure.

Figure 1:
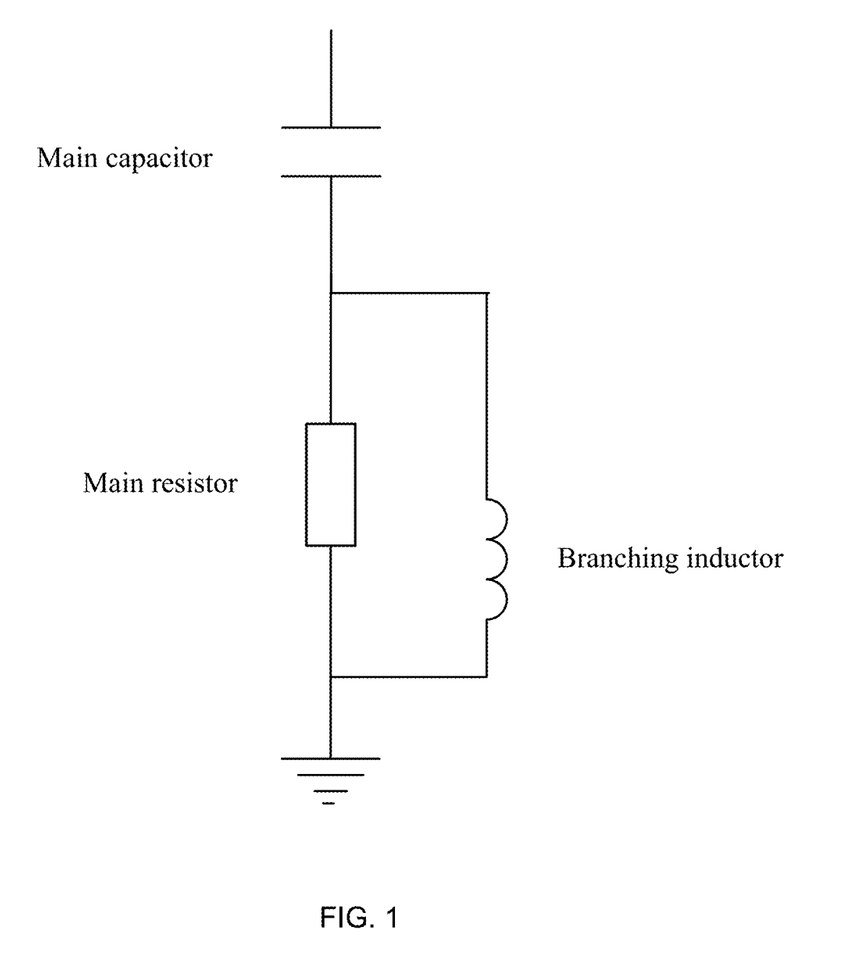
FIG. 1 is a structural diagram of a passive impedance adapter according to an embodiment of the present disclosure.
Figure 2:
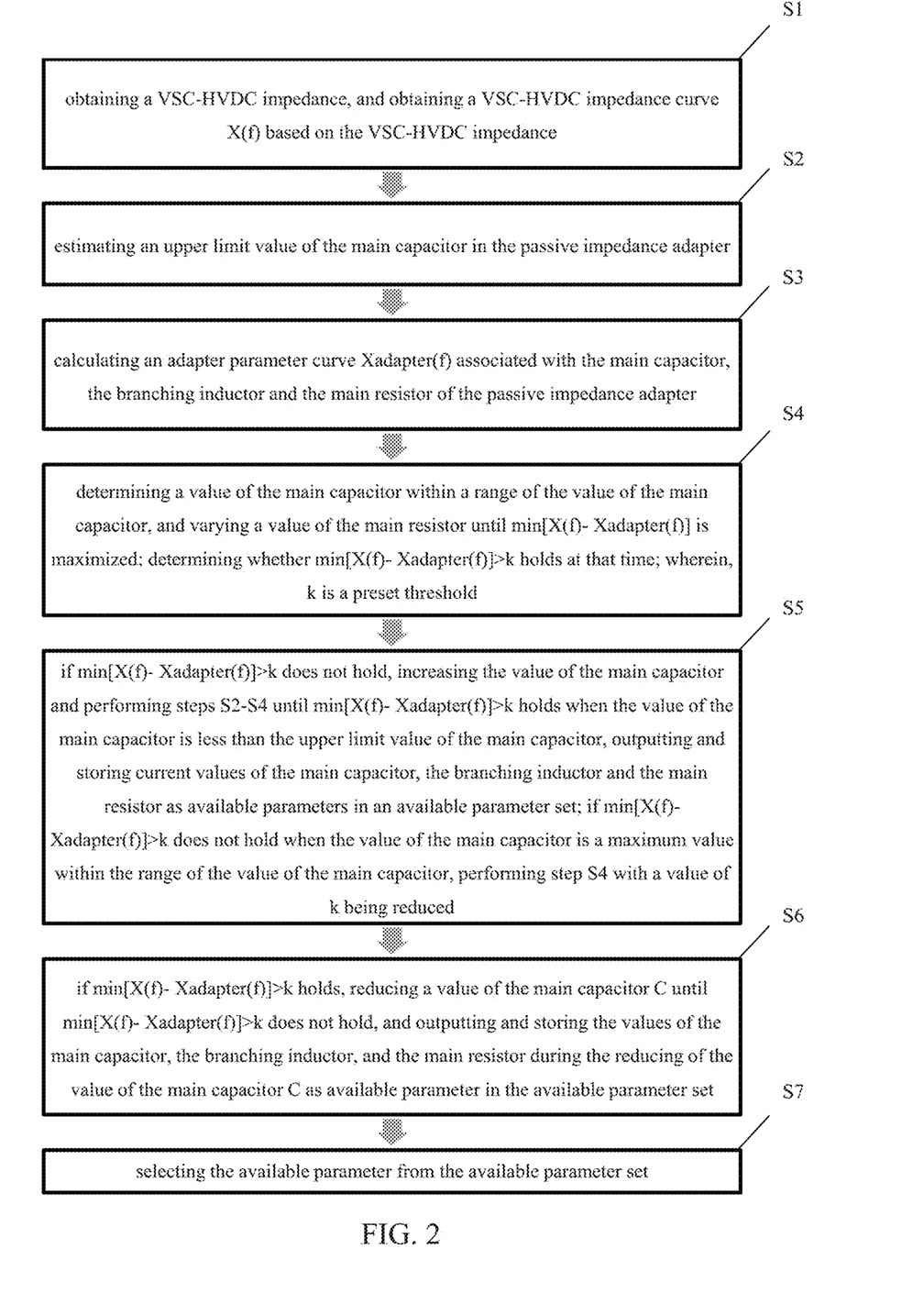
FIG. 2 is a flow chart of a method for determining a parameter of a passive impedance adapter applicable to VSC-HVDC according to an embodiment of the present disclosure.

As shown in FIG. 1, a structural diagram of a passive impedance adapter according to an embodiment of the present disclosure is illustrated, which includes: a main capacitor, a main resistor, and a branching inductor, wherein the main capacitor is connected in series with the main resistor, and the branching inductor is connected in parallel at both ends of the main resistor;

As shown in FIG. 2, a flow chart of a method for determining a parameter of a passive impedance adapter applicable to VSC-HVDC according to an embodiment of the present disclosure is illustrated. The method for determining the parameter comprises steps of:

S1. obtaining a VSC-HVDC impedance, and obtaining a VSC-HVDC impedance curve X(f) based on the VSC-HVDC impedance;

S2. estimating an upper limit value of the main capacitor in the passive impedance adapter;

S3. calculating an adapter parameter curve $X_{adapter}(f)$ associated with the main capacitor, the branching inductor and the main resistor of the passive impedance adapter;

S4. determining a value of the main capacitor within a range of the value of the main capacitor, and varying a value of the main resistor until $\min[X(f)-X_{adapter}(f)]$ is maximized; determining whether $\min[X(f)-X_{adapter}(f)] > k$ holds at that time; wherein, k is a preset threshold;

S5. if $\min[X(f)-X_{adapter}(f)] > k$ does not hold, increasing the value of the main capacitor and performing steps S2-S4 until $\min[X(f)-X_{adapter}(f)] > k$ holds when the value of the main capacitor is less than the upper limit value of the main capacitor, outputting and storing current values of the main capacitor, the branching inductor and the main resistor as available parameters in an available parameter set; if $\min[X(f)-X_{adapter}(f)] > k$ does not hold when the value of the main capacitor is a maximum value within the range of the value of the main capacitor, performing step S4 with a value of k being reduced;

S6. if $\min[X(f)-X_{adapter}(f)] > k$ holds, reducing a value of the main capacitor C until $\min[X(f)-X_{adapter}(f)] > k$ does not hold, and outputting and storing the values of the main capacitor, the branching inductor, and the main resistor during the reduction of the value of the main capacitor C as available parameters in the available parameter set;

S7. selecting the available parameter from the available parameter set.

Further, the VSC-HVDC impedance curve may be formulated as:

$$X(f) = \begin{cases} \frac{|Z_1(f)|^2}{|Re(Z_1(f))|} & Re(Z_1(f)) < 0 \\ +\infty & Re(Z_1(f)) > 0 \end{cases}$$

Herein, $|Z_1(f)|$ is an impedance magnitude of the VSC-HVDC at a frequency point f, and $Re(Z_1(f))$ is a real part of the VSC-HVDC impedance at the frequency point f.

Further, the estimating of the value of the main capacitor in the passive impedance adapter, specifically, may be performed according to a formula:

$$C = a\% \times \frac{S_c}{\omega_0 U^2}$$

In the formula, $S_C$ is a short-circuit capacity of an access point of a converter station; U is a rated voltage of the access point of the converter station; wo is an angular frequency of a fundamental wave; a is a voltage fluctuation value allowed in standard;

The value of the main capacitor is set according to values of the short-circuit capacity at the access point of the converter station, the rated voltage at the access point of the converter station and the fundamental frequency.

Preferably, the value of $\omega_0$ is equal to 50*2π or 60*2π.

Preferably, a % may be selected to be 1%-2%, based on the provisions of DL5223 "For the switching of a single group of reactive components, the change rate of voltage in the steady-state AC bus should not exceed 1%-2% of the rated voltage". If there arm other special regulations in the power grid, the relevant regulations shall be followed.

The estimated value of the main resistor may be selected to be less than min(X(f)).

The estimated value of the branching inductor, that is, the inductance of the branching inductor, can be selected to be about 0.1% of the capacitance of main capacitor. The estimated value of branching capacitor, that is, resonance with branch inductor at fundamental frequency of the power grid.

If the value of the branching capacitor is so large that its cost is extremely high, which is higher than the cost saved by eliminating the loss of the main resistor R, the branching capacitor can be omitted.

Further, the parameter curve of the adapter is formulated as:

$$X_{adapter}(f) = \frac{|Z_{adapter}(f)|}{\cos\phi(f)}$$

Herein, $X_{adapter}(f)$ is an impedance amplitude of the passive impedance adapter.

Further, the step S5 further comprises: performing steps S2-S4 with the value of the main capacitor being reduced until the value of the main capacitor is minimized within the range of the value of the main capacitor; and adding corresponding values of the main capacitor, branching inductor and main resistor into the available parameter set.

Figure 3:
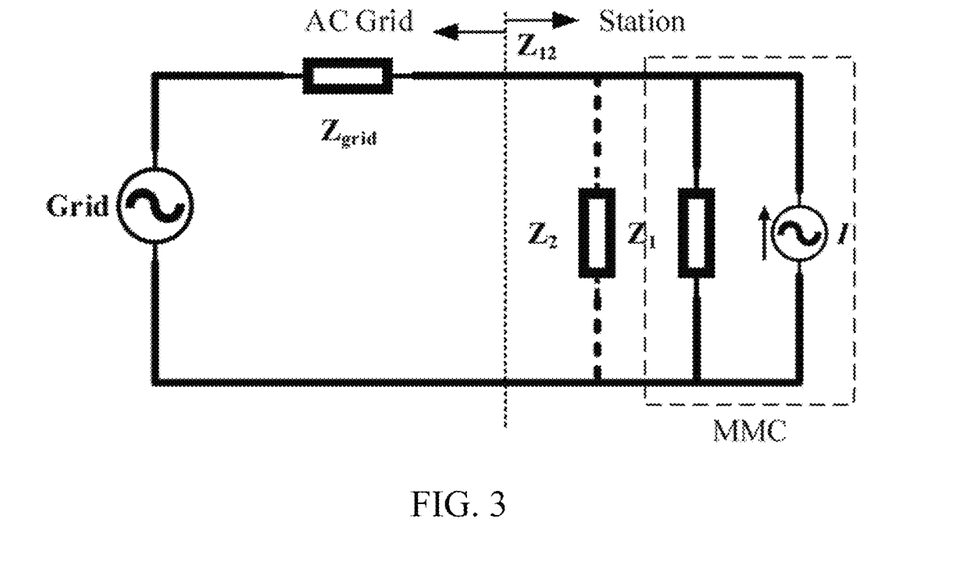
FIG. 3 is a schematic diagram of an impedance adapter according to a specific embodiment of the present disclosure.

As shown in FIG. 3, a schematic diagram of an impedance adapter according to an embodiment of the present disclosure is illustrated. $Z_{grid}$ in FIG. 3 is the impedance of the AC power grid, and its amplitude varies between (0, +∞) and the phase angle varies between (−90°, +90°), and the real part is always positive. $Z_1$ is the AC impedance of MMC VSC-HVDC, $Z_2$ is the passive impedance adapter. If the real part of the converter station impedance is always positive after Z1 and Z2 are connected in parallel, there is no condition for harmonic resonance in the system.

In order to satisfy the real part of the impedance of the converter station is always positive after $Z_2$ parallel connection, presetting k≥0. The larger the value of k, the higher the design requirements, the greater the stability margin. As the value of the main resistor becomes larger, the low-band $X_{adapter}(f)$ becomes larger, and the high-band $X_{adapter}(f)$ becomes smaller. Considering this characteristic, there is an optimal value of the main resistor at a specific value of the main capacitor.

In a specific embodiment, it is assumed that the VSC-HVDC AC equivalent inductor L is 202 mH, the control link delay is 600 μs, and the PI controller parameter is 50, 500. Four converter valves are connected in parallel on the AC side.

Figure 4:
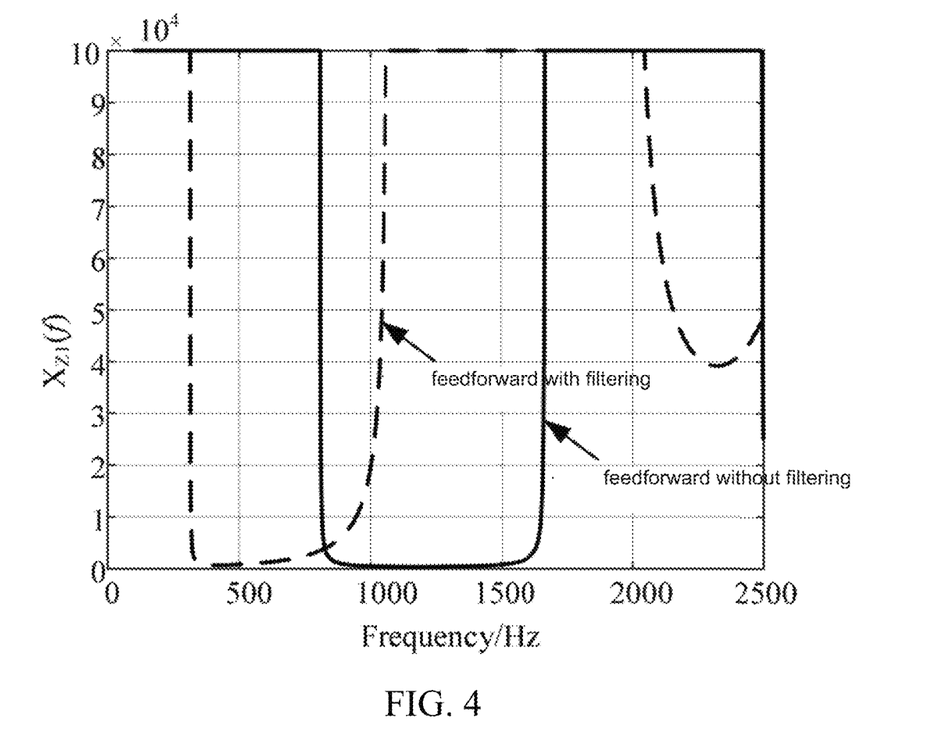
FIG. 4 is a curve diagram showing the feedforward with filtering and feedforward without filtering according to a specific embodiment of the present disclosure.

(1) Obtaining VSC-HVDC impedance characteristics. Only the influence of the current inner loop and feedforward control are considered here. The impedances transfer functions of the system with and without feedforward are:

$$\begin{cases} Z_{1withoutFilter} = \frac{sL + G_{PI}G_d}{1 - G_d} \end{cases}$$

$$\left\{ Z_{1withFilter} = \frac{sL + G_{Pl}G_d}{1 - G_d G_{filter}} \right.$$

In order to make the curve diagram intuitive, the portions of X(f) which are greater than 100000 are all modified to 100000. The curves of the feedforward with filtering and the feedforward without filtering arm shown in FIG. 4.

(2) Assuming that the short-circuit capacity of the AC grid is 10 GVA, causing 1% voltage fluctuation corresponds to reactive power Q=100 Mvar, and the main capacitor C=1.155 μF is calculated according to the formula.

(3) Selecting the branching inductor $L_1$=300 mH and the branching capacitor $C_1$=33.774 μF.

Figure 5:
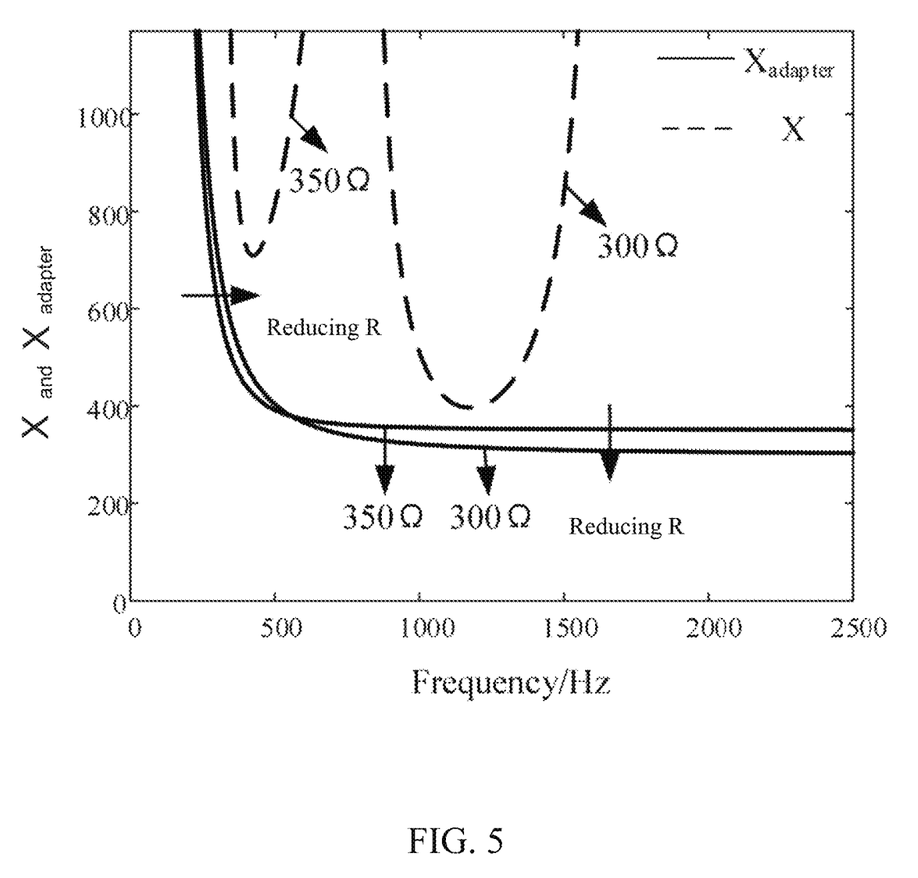
FIG. 5 is a schematic diagram showing X (f) and $X_{adapter}$ (f) when the main resistor according to a specific embodiment of the present disclosure is 3000 and 3500, respectively.

(4) Since the minimum value of X(f) is 396, selecting the main resistor R=3500. Obtaining the $X_{adapter}$(f) curve according to the formula, providing k=0, and drawing the schematic diagram of X(f) and $X_{adapter}$(f) when R is 3000 and 3500, as shown in FIG. 5. It can be seen from FIG. 5 that X(f)–$X_{adapter}$(f)>0 holds at all times. Therefore, the above two sets of parameters are feasible.

Figure 6:
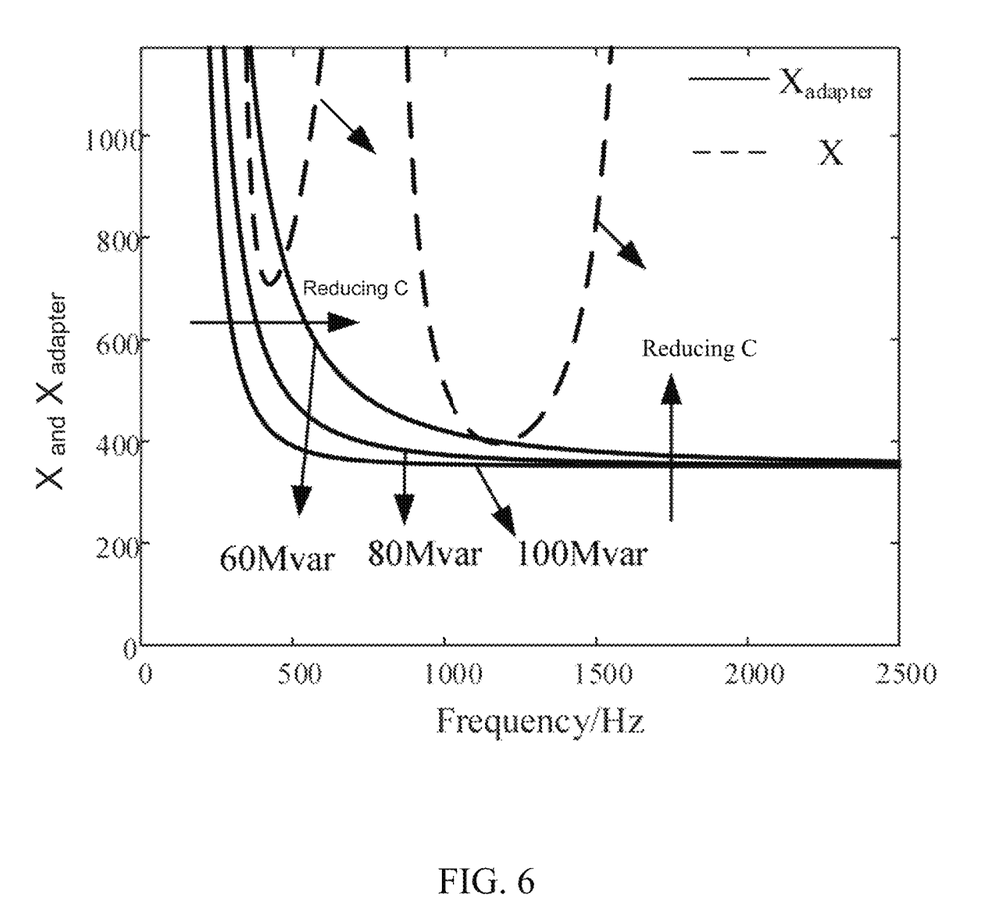
FIG. 6 is a schematic diagram showing X (f) and Xadapter (f) when the reactive power according to a specific embodiment of the present disclosure is 100 Mvar, 80 Mvar, and 60 Mvar, respectively.

(5) Trying to reduce the capacity of the main capacitor to 80 Mvar or 60 Mvar, selecting the main resistor R=350Ω, the branching inductor $L_1$ and the branching capacitor $C_1$ remain unchanged. It can be seen from FIG. 6 that when the reactive power is selected to be 60 Mvar, the left and lower boundaries of X(f) and $X_{adapter}$(f) have overlapping areas, and it is impossible to optimize the main resistor R to keep X(f)–$X_{adapter}$(f)>0 hold in the full frequency band, so the optimization is stopped, and the capacity of the main capacitor is selected to be 80 Mvar.

(6) Obtaining a set of available parameters from (5): reactive power 80 Mvar, C=0.924 μF; R=350Ω; $L_1$=300 mH; $C_1$=33.774 μF.

It can be seen from the above analysis that in this specific embodiment, the passive impedance adapter parameters determined by a method for determining a parameter of a passive impedance adapter applicable to VSC-HVDC according to an embodiment of the present disclosure can make the impedance always have a positive real part, and no high frequency harmonic resonance will occur in any AC power grid.

Figure 7:
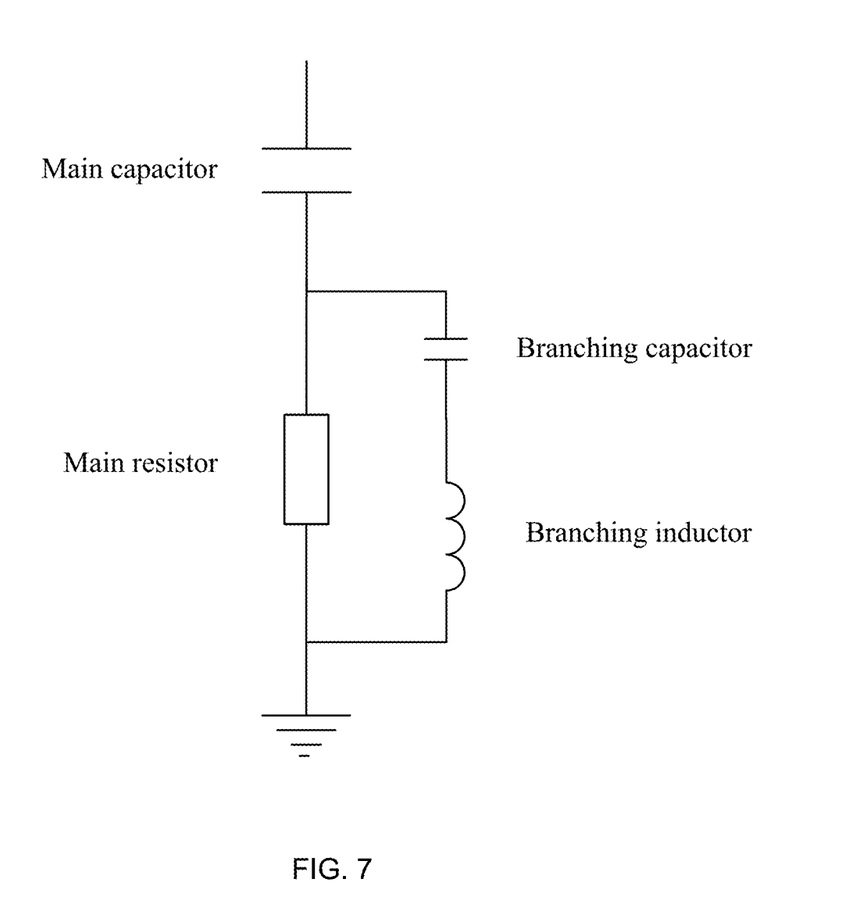
FIG. 7 is a schematic diagram of an impedance adapter according to another embodiment of the present disclosure.

As shown in FIG. 7, a schematic diagram of an impedance adapter according to another embodiment of the present disclosure is illustrated. The passive impedance adapter comprises a main capacitor, a main resistor, a branching inductor, and a branching capacitor, the main capacitor is connected in series with the main resistor, the branching inductor and the branching capacitor are connected in series to obtain a series branch, and the series branch is connected in parallel at both ends of the main resistor.

Compared with the prior art, the method for determining the parameter of the passive impedance adapter applicable to VSC-HVDC according to embodiments of the present disclosure has the following beneficial effects.

By estimating the range of the value of the main capacitor, and optimizing the value of the main capacitor in the range of the value of the main capacitor until $X_{Z1}$(f)–$X_{adapter}$(f) which is greater than the preset threshold k holds in the full frequency band, it realizes positive impedance characteristics in the full frequency band of interest, and completely eliminates the risk of harmonic resonance. It avoids high-frequency resonance which may be caused when the impedance between the VSC-HVDC transmission system and the transmitting or receiving power grid is mismatched, thereby ensuring safe and stable operation of the power system. By adjusting the value of k to change the design standard, a variety of available parameters which meet the requirements, and facilitate system stability and suppression of low-frequency oscillations can be obtained.

Another embodiment of the present disclosure correspondingly provides a parameter determination device for a passive impedance adapter applicable to VSC-HVDC, comprising a processor, a memory, and a computer program stored in the memory and configured to be executed by the processor, the processor is configured for executing the computer program to implement the method for determining the parameter of the passive impedance adapter applicable to VSC-HVDC described in the first embodiment. The parameter determination device for a passive impedance adapter applicable to VSC-HVDC may be a computing device such as a desktop computer, a notebook, a palmtop computer, a cloud server, and the like. The parameter determination device for a passive impedance adapter applicable to VSC-HVDC may comprise but not limited to a processor and a memory.

Another embodiment of the present disclosure correspondingly provides a computer-readable storage medium, wherein the computer-readable storage medium comprises a computer program stored therein, wherein when the computer program is executed, a device on which the computer-readable storage medium is mounted is controlled to execute the method for determining the parameter of the passive impedance adaptor applicable to VSC-HVDC described in first embodiment of the present disclosure.

The processor can be a central processing unit (Central ProCessing Unit, CPU) or other general-purpose processors, digital signal processors (Digital Signal ProCessor, DSP), application-specific integrated circuits (AppliCation SpeCifiC Integrated CirCuit, ASIC), and Field programmable gate array (Field-Programmable Gate Array, FPGA) or other programmable logic devices, discrete gate or transistor logic devices, discrete hardware components, etc. The general-purpose processor may be a microprocessor or the processor, any conventional processor, etc. The processor is the control center of the parameter determination device for a passive impedance adapter applicable to VSC-HVDC, and uses various interfaces and lines to connect various parts of the parameter determination device for a passive impedance adapter applicable to VSC-HVDC.

The memory may be used to store the computer program and/or module, and the processor implements various functions of the parameter determination device for a passive impedance adapter applicable to VSC-HVDC by running or executing computer programs and/or modules stored in the memory and calling data stored in the memory. The memory may mainly include a storage program area and a storage data area, wherein the storage program area may store an operating system, application programs required by at least one function (such as a sound playing function, an image playing function, etc.), etc.; The storage data area can store data (such as audio data, phone book, etc.) created according to the use of mobile phones and the like. In addition, the memory may include high-speed random access memory, and may also include non-volatile memory, such as hard disk, memory, plug-in hard disk, smart memory card (Smart Media Card, SMC), and secure digital (SeCure Digital, SD) card, flash card (Flash Card), at least one disk storage device, flash memory device, or other volatile solid-state storage devices.

Wherein, if the module/unit integrated with the parameter determination device for a passive impedance adapter applicable to VSC-HVDC is implemented in the form of a software functional unit and sold or used as an independent product, it can be stored in a computer-readable storage medium. Based on this understanding, all or some steps of the methods according to the above embodiments of the present disclosure can also be implemented by executing computer program instructions through relevant hardware. The computer program can be stored in a computer-readable storage medium. When the computer program is executed by the processor, the steps of the foregoing method of the embodiments may be implemented. Herein, the computer program includes computer program codes, and the computer program codes may be in the form of source code, object code, executable file, or some intermediate form. The computer readable medium may include: any entity or device capable of carrying the computer program codes, a recording medium, a U disk, a mobile hard disk, a magnetic disk, an optical disk, a computer memory, a read-only memory (ROM, Read-Only Memory), Random Access Memory (RAM, Random ACCess Memory), electrical carrier signals, telecommunications signals and software distribution media, etc.

It should be noted that the device of embodiments described above are merely exemplary, wherein the units described as separate components may or may not be physically separated, and the components displayed as units may or may not be physical units, that is, they may be located in one place, or may be distributed on multiple network units. Some or all of the modules may be selected according to actual needs to achieve the purpose of the solution of the present embodiment. In addition, in the figures of the device embodiments according to the present disclosure, the connection relationship between the modules indicates that there is a communication connection between them, which may be specifically implemented as one or more communication buses or signal lines. Those skilled in the art can understand and implement it without paying inventive work.

The above is some preferred embodiments of the present disclosure. It should be pointed out that the present invention is intended to cover all changes and modifications those skilled in the art can make without departing from the principles of the present disclosure.

The invention claimed is:

1. A method for determining a parameter of a passive impedance adapter applicable to a VSC-HVDC transmission system, wherein, the passive impedance adapter comprises a main capacitor, a main resistor and a branching inductor; the main capacitor is connected in series with the main resistor; the branching inductor is connected in parallel across the main resistor;

the method for determining the parameter comprises steps of:

S1. obtaining a VSC-HVDC impedance of the VSC-HVDC transmission system, and obtaining a VSC-HVDC impedance curve X(f) based on the VSC-HVDC impedance;

S2. estimating an upper limit value of the main capacitor in the passive impedance adapter;

S3. calculating an adapter parameter curve $X_{adapter}(f)$ associated with the main capacitor, the branching inductor and the main resistor of the passive impedance adapter;

S4. determining a value of the main capacitor within a range of the value of the main capacitor, and varying a value of the main resistor until min [X(f)–$X_{adapter}$(f)] is maximized; determining whether min [X(f)–$X_{adapter}$(f)]>k holds at that time; wherein, k is a preset threshold;

S5. if min [X(f)–$X_{adapter}$(f)]>k does not hold, increasing the value of the main capacitor and performing steps S2-S4 until min [X(f)–$X_{adapter}$(f)]>k holds when the value of the main capacitor is less than the upper limit value of the main capacitor, outputting and storing current values of the main capacitor, the branching inductor and the main resistor as available parameters in an available parameter set; if min [X(f)–$X_{adapter}$(f)]>k does not hold when the value of the main capacitor is a maximum value within the range of the value of the main capacitor, performing step S4 with a value of k being reduced;

S6. if min [X(f)–$X_{adapter}$(f)]>k holds, reducing a value of the main capacitor C until min [X(f)–$X_{adapter}$(f)]>k does not hold, and outputting and storing the values of the main capacitor, the branching inductor, and the main resistor during the reducing of the value of the main capacitor C as available parameter in the available parameter set;

S7. selecting the available parameter from the available parameter set, and connecting the VSC-HVDC transmission system to a power grid via the passive impedance adapter by unitizing the selected parameter.

2. The method for determining the parameter of the passive impedance adapter applicable to the VSC-HVDC transmission system according to claim 1, wherein the VSC-HVDC impedance curve is formulated as:

$$X(f) = \begin{cases} \dfrac{|Z_1(f)|^2}{|Re(Z_1(f))|} & Re(Z_1(f)) < 0 \\ +\infty & Re(Z_1(f)) > 0 \end{cases}$$

wherein, $|Z_1(f)|$ is an impedance magnitude of the VSC-HVDC at a frequency point f, and $Re(Z_1(f))$ is a real part of the VSC-HVDC impedance at the frequency point f.

3. The method for determining the parameter of the passive impedance adapter applicable to the VSC-HVDC transmission system according to claim 2, wherein the estimating of the upper limit value of the main capacitor in the passive impedance adapter, specifically, is performed according to a formula:

$$C = a\% \times \dfrac{S_c}{\omega_0 U^2}$$

in the formula, $S_C$ is a short-circuit capacity of an access point of a converter station; U is a rated voltage of the access point of the converter station; $\omega_0$ is an angular frequency of a fundamental wave; a is a voltage fluctuation value allowed in standard;

and the upper limit value of the main capacitor is set according to values of the short-circuit capacity at the access point of the converter station, the rated voltage at the access point of the converter station and the fundamental frequency.

4. The method for determining the parameter of the passive impedance adapter applicable to the VSC-HVDC transmission system according to claim 3, wherein the parameter curve of the adapter is formulated as:

$$X_{adapter}(f) = \frac{|Z_{adapter}(f)|}{\cos\phi(f)}$$

wherein, $X_{adapter}(f)$ is an impedance amplitude of the passive impedance adapter, $\cos\phi(f)$ is a cosine of a phase angle of $Z_{adapater}(f)$.

5. The method for determining the parameter of the passive impedance adapter applicable to the VSC-HVDC transmission system according to claim 4, wherein the step S5 further comprises: performing steps S2-S4 with the value of the main capacitor being reduced until the value of the main capacitor is minimized within the range of the value of the main capacitor; and adding corresponding values of the main capacitor, branching inductor and main resistor into the available parameter set.

6. A parameter determination device, comprising a processor, a memory, and a computer program stored in the memory and configured to be executed by the processor, the processor is configured for executing the computer program to implement the method for determining the parameter of the passive impedance adapter applicable to the VSC-HVDC transmission system according to claim 1.

7. A non-transitory computer-readable storage medium, wherein the computer-readable storage medium comprises a computer program stored therein, wherein when the computer program is executed, a device on which the computer-readable storage medium is mounted is controlled to execute the method for determining the parameter of the passive impedance adaptor applicable to the VSC-HVDC transmission system according to claim 1.

8. A parameter determination device, comprising a processor, a memory, and a computer program stored in the memory and configured to be executed by the processor, the processor is configured for executing the computer program to implement the method for determining the parameter of the passive impedance adapter applicable to the VSC-HVDC transmission system according to claim 2.

9. A parameter determination device, comprising a processor, a memory, and a computer program stored in the memory and configured to be executed by the processor, the processor is configured for executing the computer program to implement the method for determining the parameter of the passive impedance adapter applicable to the VSC-HVDC transmission system according to claim 3.

10. A parameter determination device, comprising a processor, a memory, and a computer program stored in the memory and configured to be executed by the processor, the processor is configured for executing the computer program to implement the method for determining the parameter of the passive impedance adapter applicable to the VSC-HVDC transmission system according to claim 4.

11. A parameter determination device, comprising a processor, a memory, and a computer program stored in the memory and configured to be executed by the processor, the processor is configured for executing the computer program to implement the method for determining the parameter of the passive impedance adapter applicable to the VSC-HVDC transmission system according to claim 5.

12. A non-transitory computer-readable storage medium, wherein the computer-readable storage medium comprises a computer program stored therein, wherein when the computer program is executed, a device on which the computer-readable storage medium is mounted is controlled to execute the method for determining the parameter of the passive impedance adaptor applicable to the VSC-HVDC transmission system according to claim 2.

13. A non-transitory computer-readable storage medium, wherein the computer-readable storage medium comprises a computer program stored therein, wherein when the computer program is executed, a device on which the computer-readable storage medium is mounted is controlled to execute the method for determining the parameter of the passive impedance adaptor applicable to the VSC-HVDC transmission system according to claim 3.

14. A non-transitory computer-readable storage medium, wherein the computer-readable storage medium comprises a computer program stored therein, wherein when the computer program is executed, a device on which the computer-readable storage medium is mounted is controlled to execute the method for determining the parameter of the passive impedance adaptor applicable to the VSC-HVDC transmission system according to claim 4.

15. A non-transitory computer-readable storage medium, wherein the computer-readable storage medium comprises a computer program stored therein, wherein when the computer program is executed, a device on which the computer-readable storage medium is mounted is controlled to execute the method for determining the parameter of the passive impedance adaptor applicable to the VSC-HVDC transmission system according to claim 5.

* * * * *